US012598415B2

(12) United States Patent
Balan et al.

(10) Patent No.: US 12,598,415 B2
(45) Date of Patent: Apr. 7, 2026

(54) AUDIO PROCESSING SYSTEM AND METHOD

(71) Applicant: JAGUAR LAND ROVER LIMITED, Warwickshire (GB)

(72) Inventors: Abhijith Balan, Whitley (GB); Sarvesh Khandelwal, Whitley (GB); Anirudh Khawas, Whitley (GB); Terence Soares, Whitley (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 209 days.

(21) Appl. No.: 18/191,376

(22) Filed: Mar. 28, 2023

(65) Prior Publication Data

US 2023/0308802 A1     Sep. 28, 2023

(30) Foreign Application Priority Data

Mar. 28, 2022    (GB) ...................................... 2204369

(51) Int. Cl.
| | |
|---|---|
| *H04R 1/22* | (2006.01) |
| *B60W 10/06* | (2006.01) |
| *H04R 3/02* | (2006.01) |
| *H04R 3/04* | (2006.01) |
| *H04R 5/02* | (2006.01) |
| *H04R 5/027* | (2006.01) |

(52) U.S. Cl.
CPC ............... *H04R 1/22* (2013.01); *B60W 10/06* (2013.01); *H04R 3/02* (2013.01); *H04R 3/04* (2013.01); *H04R 5/02* (2013.01); *H04R 5/027* (2013.01); *H04R 2499/13* (2013.01)

(58) Field of Classification Search
CPC ... H04R 1/22; H04R 3/02; H04R 3/04; H04R 5/02; H04R 5/027; H04R 2499/13; B60W 10/06
See application file for complete search history.

(56) References Cited

U.S. PATENT DOCUMENTS

| | | | | |
|---|---|---|---|---|
| 9,269,344 B2 * | 2/2016 | Pan | .................. | G10K 11/17854 |
| 10,414,337 B2 * | 9/2019 | Kreifeldt | ................ | G10K 15/02 |

(Continued)

FOREIGN PATENT DOCUMENTS

| | | |
|---|---|---|
| JP | 2014052275 A | 3/2014 |

OTHER PUBLICATIONS

Combined Search and Examination Report under Sections 17 and 18(3) for Application No. GB2204369.9 dated Dec. 1, 2022.

*Primary Examiner* — Andrew Sniezek
(74) *Attorney, Agent, or Firm* — Carlson, Gaskey & Olds, P.C.

(57) ABSTRACT
An audio processing system, such as in a vehicle, is configured to process an audio signal representing sound waves originating from at least one vehicle system disposed on a vehicle. The audio processing system includes a controller configured to receive the audio signal from a microphone. The controller processes the audio signal to generate a frequency domain representation of the audio signal. The controller also receives a first operating signal indicating an operating state of a first said-vehicle system. The controller decomposes the frequency domain representation of the audio signal in dependence on the first operating signal to identify a first audio profile associated with the operation of the first vehicle system.

10 Claims, 11 Drawing Sheets

(56)                    References Cited

U.S. PATENT DOCUMENTS

| | | |
|---|---|---|
| 2003/0053636 A1 | 3/2003 | Goldberg et al. |
| 2017/0257073 A1 | 9/2017 | Hera et al. |
| 2017/0330547 A1 | 11/2017 | Stebbins et al. |

* cited by examiner

Audio frequency data wrt engine speed(Hz)

AUDIO PROCESSING SYSTEM AND METHOD

CROSS REFERENCE TO RELATED APPLICATION

This application claims priority to United Kingdom Patent Application No. GB2204369.9, which was filed on 28 Mar. 2022.

TECHNICAL FIELD

The present disclosure relates to an audio signal processing method and apparatus. The present disclosure relates to an audio processing system for analysing an audio signal. The audio signal may, for example, represent sound waves generated by one or more systems on a vehicle. Aspects of the invention relate to an audio processing system, a vehicle monitoring system, a vehicle and a method of processing an audio signal.

BACKGROUND

It is known that audio can be used for the analysis and diagnosis of systems in a vehicle, such as an automobile. However, vehicles are complex systems with numerous interconnected systems. As a result, the analysis of the audio signal can be challenging since it is difficult to differentiate between different audio components.

It is an aim of the present invention to address one or more of the disadvantages associated with the prior art.

SUMMARY OF THE INVENTION

Aspects and embodiments of the invention provide an audio processing system, a method of processing an audio signal and a vehicle as claimed in the appended claims.

According to an aspect of the present invention there is provided an audio processing system for a vehicle, the audio processing system being configured to process an audio signal representing sound waves originating from at least one vehicle system disposed on the vehicle, the audio processing system comprising a controller configured to:
  receive the audio signal from a microphone;
  process the audio signal to generate a frequency domain representation of the audio signal;
  receive a first operating signal indicating an operating state of a first said vehicle system; and
  decompose the frequency domain representation of the audio signal in dependence on the first operating signal to identify a first audio profile associated with the operation of the first vehicle system.

The analysis of the audio signal is performed in dependence on the current (i.e., instantaneous) operating state of the vehicle system. This facilitates the identification and extraction of components of the audio signal associated with the first vehicle system. The first operating signal may be used as a base signal to facilitate decomposition of the audio signal. The audio profile identified within the audio signal may be correlated to the operating state of the vehicle system.

The first operating signal may, for example, indicate a rotational speed (rpm) of the vehicle system. The first operating signal may indicate a rotational speed of an internal combustion engine or an electric traction motor provided in the vehicle.

The first audio profile corresponds to sound waves originating from the first vehicle system. The first component may comprise an audio profile associated with the first vehicle system.

The controller may comprise at least one electronic processor for processing the audio signal to generate the frequency domain representation. The at least one electronic processor may comprise: at least one electrical input for receiving the audio signal and the at least one operating signal; and at least one electrical output for outputting a first component signal identifying the first audio profile.

The first audio profile may comprise one or more first active orders. The or each first active order may represent an audio component which is in-phase with the first vehicle system. The amplitude of the or each first active order may be larger than an audio component which is out-of-phase with the first vehicle system.

The frequency domain representation may be decomposed to identify a second vehicle system. The decomposition may be performed in dependence on the first operating signal. For example, this approach may be applied for two or more vehicle systems having a synchronized operation.

Alternatively, or in addition, the controller may receive a second operating signal indicating an operating state of a second said vehicle system. The frequency domain representation of the audio signal may be decomposed in dependence on the second operating signal to identify a second audio profile associated with the operation of the second vehicle system.

The second audio profile may comprise one or more second active orders. The or each second active order may represent an audio component which is in-phase with the second vehicle system. The amplitude of the or each second active order may be larger than an audio component which is out-of-phase with the second vehicle system.

The controller may be configured to decouple the first audio profile from the audio signal. The audio profile corresponding to the first audio profile may be decoupled from the sound waves originating from one or more other audio sources. The audio sources may, for example, comprise other vehicle systems.

The decoupling of the first audio profile may comprise generating a first decoupled audio signal composed of or consisting of the first audio profile. A filter may be applied to isolate the first audio profile. For example, a noise rejection filter may be applied to reject noises associated with the other audio sources. The noise rejection filter may retain the or each active order of the first audio profile. The noise rejection filter may at least partially reduce one or more active orders associated with a second audio profile. The noise rejection filter may retain the or each active order in the first audio profile and at least partially reduce an active order associated with a second audio profile. The second audio profile may be associated with a second vehicle system. The first and second vehicle systems may be different from each other.

The decoupling of the first audio profile may comprise generating a second decoupled audio signal which excludes the first audio profile. A filter may be applied at least partially to remove the first audio profile from the audio signal. For example, a masking filter may be applied at least partially to reduce a magnitude of the first audio profile. The masking filter may at least partially reduce a magnitude of the or each active order of the first audio profile. The second decoupled audio signal may be composed of the remainder of the audio signal.

Alternatively, or in addition, an amplifier may be applied to increase a magnitude of the or each active order of the first audio profile.

The controller may be configured to identify at least one fault condition indicator. The at least one fault condition indicator may be present in the first audio profile, for example. The at least one fault condition indicator may be predefined.

The controller may be configured to identify at least one fault condition indicator in the first decoupled audio signal or the second decoupled audio signal.

The controller may be configured to generate a first sound augmentation signal for controlling a sound generating device. The first sound augmentation signal may be generated in dependence on the identified first audio profile. The first sound augmentation signal may increase an amplitude of one or more active orders of the first audio profile.

The first sound augmentation signal may be configured to control the sound generating device to generate sound waves to enhance the sound waves originating from the first vehicle system.

The controller may be configured to generate a first sound rejection signal. The first sound rejection signal may be configured to controlling at least one sound generating device. The or each sound generating device may, for example, comprise a loudspeaker. The first sound rejection signal may be generated in dependence on the identified first audio profile. The first sound rejection signal may be configured to control the at least one sound generating device to generate sound waves to reduce or to cancel the sound waves originating from the first vehicle system. The first sound rejection signal may cause the sound generating device to generate anti-noise to reduce or to cancel the sound waves originating from the first vehicle.

The first vehicle system may comprise an internal combustion engine. The first operating signal may indicate an operating speed of the internal combustion engine.

The first vehicle system may comprise a turbocharger. The first operating signal may indicate a rotational speed of the turbocharger.

The first vehicle system may comprise a balancer shaft. The first operating signal may indicate a rotational speed of the balancer shaft.

The first vehicle system comprises an electric motor; and the first operating signal indicates an operating speed of the electric motor.

The controller may be configured to receive a second operating signal indicating an operating state of a second said vehicle system. The controller may be configured to decompose the frequency domain representation of the audio signal in dependence on the second operating signal to identify a second audio profile associated with the operation of the second vehicle system.

The audio processing system may comprise a microphone for generating the audio signal representing the sound waves. The microphone may be an onboard microphone installed in a cabin of the vehicle. The controller may be configured to communicate with a vehicle telematic unit to access the audio signal.

An analysis is performed to identify active orders occurring in the audio analysis. The or each active order comprises a peak representing a higher energy level. The or each active order may be in-phase with the operation of a vehicle system. The or each active order may, for example, be an active engine order representing an audio component (or audio signature) which is in-phase with the operation of the internal combustion engine. Conversely, the or each trough in the audio analysis may represent an audio component which is out-of-phase with the operation of the internal combustion engine.

According to a further aspect of the present invention there is provided a vehicle monitoring system comprising an audio processing system as described herein.

According to a further aspect of the present invention there is provided a vehicle comprising audio processing system as described herein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

5

Figures 7A, 7B:
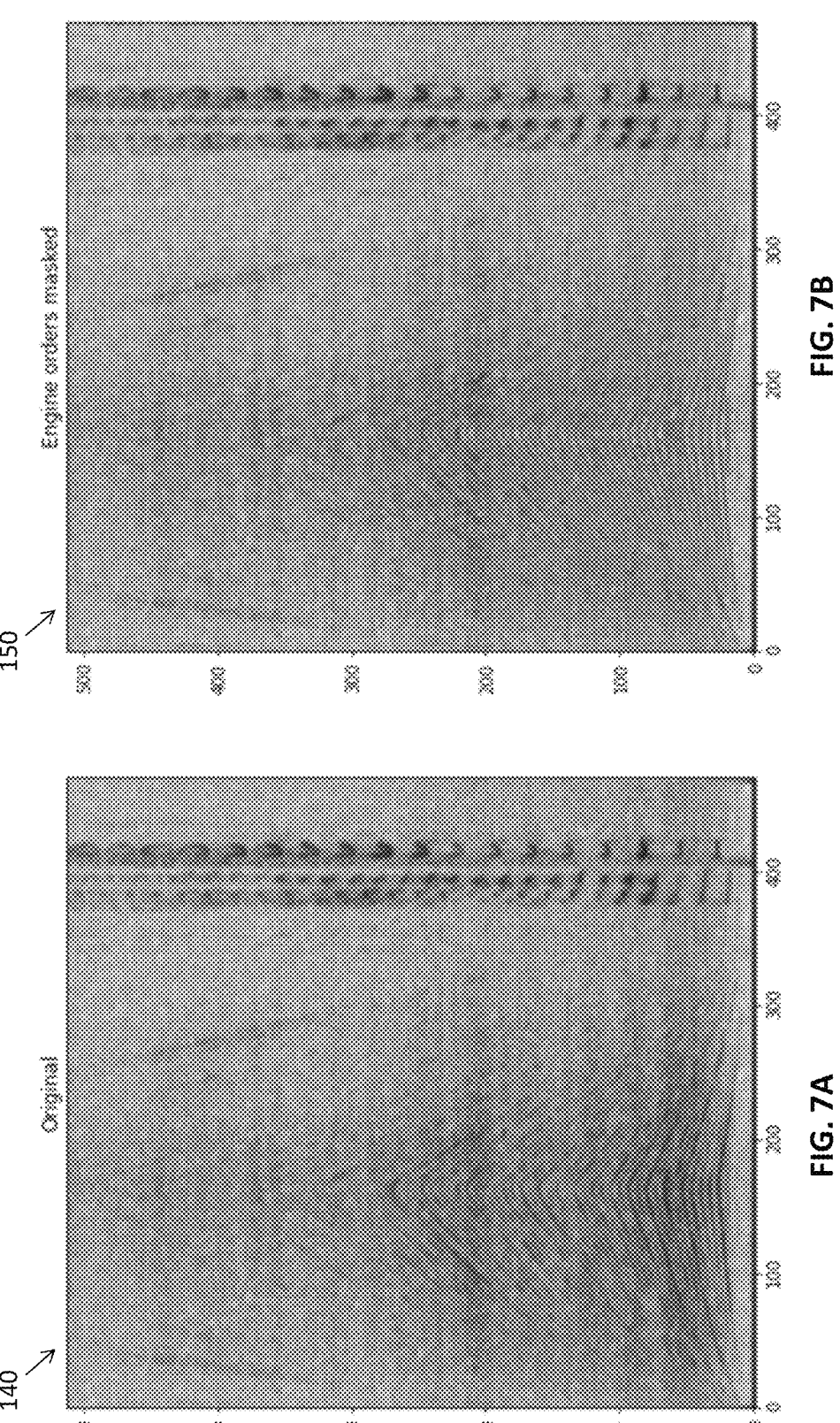
Figures 8A, 8B, 8C:
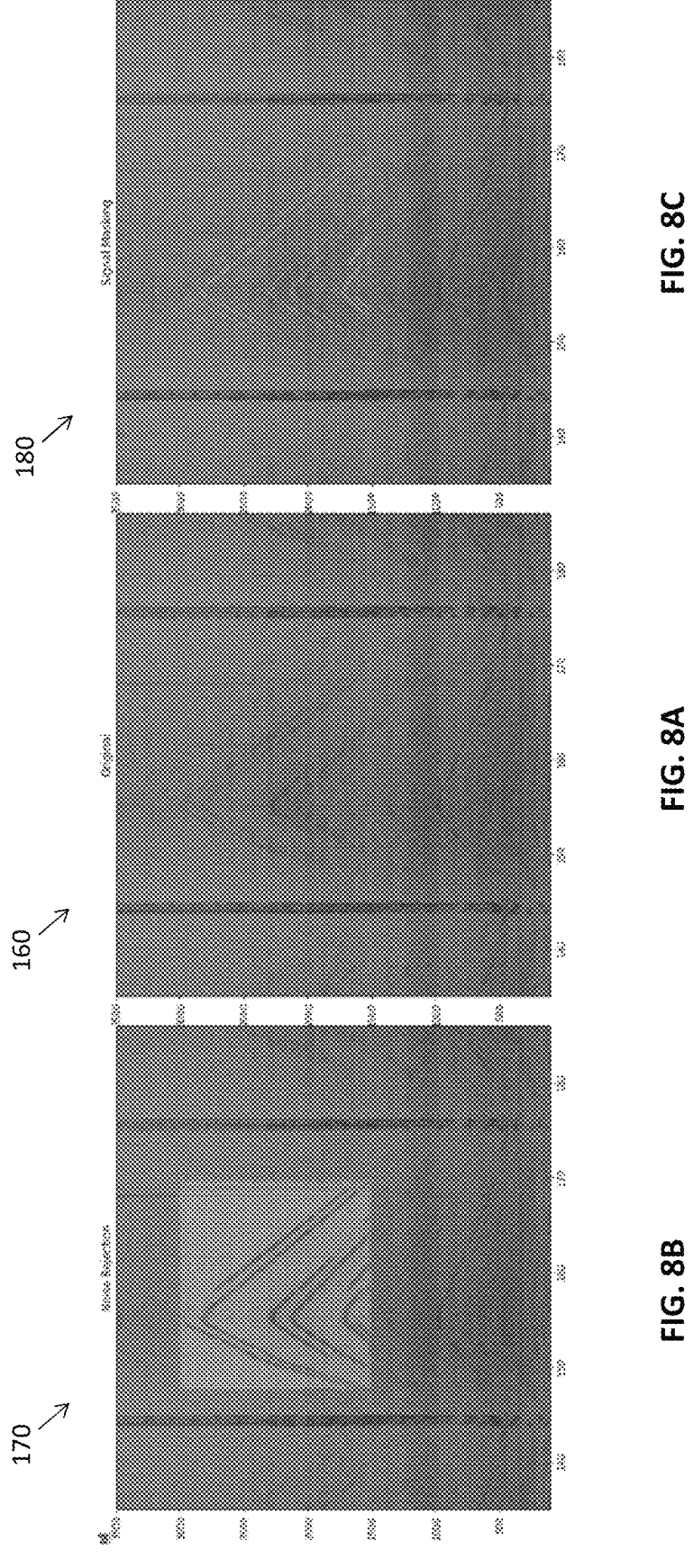
Figures 9A, 9B, 9C:
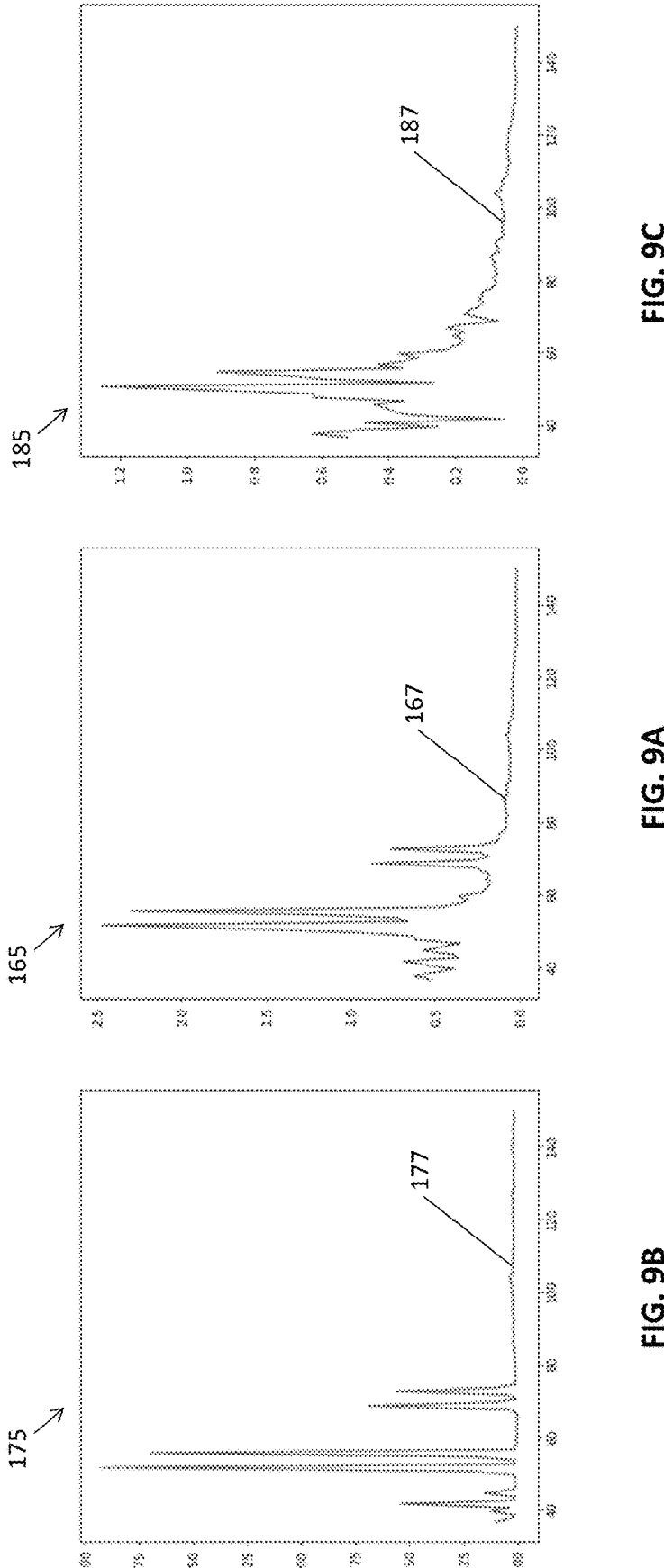
Figure 10B:
Figure 10B:
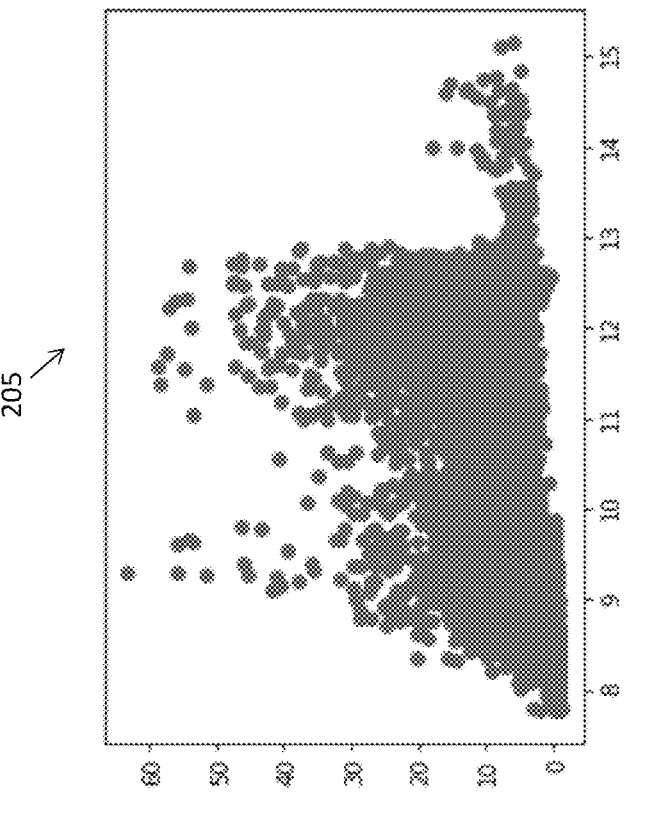
Figure 10A:
Figure 10A:
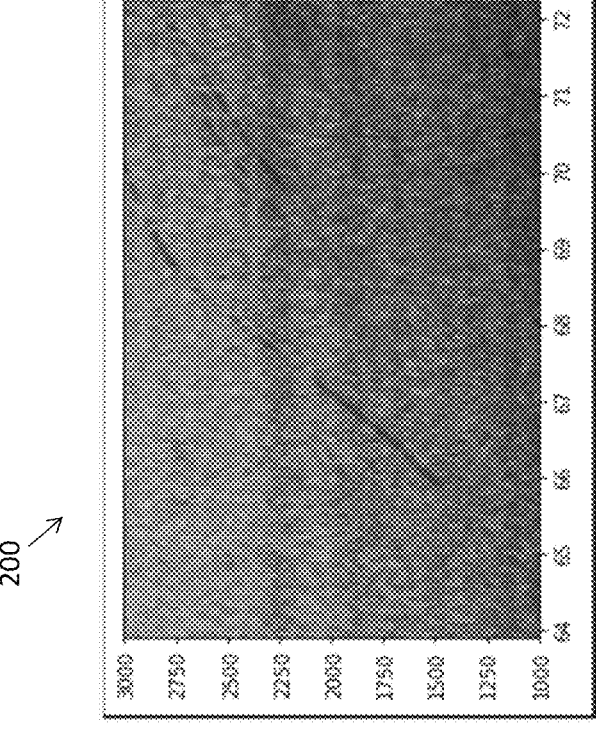
Figures 11A, 11B:
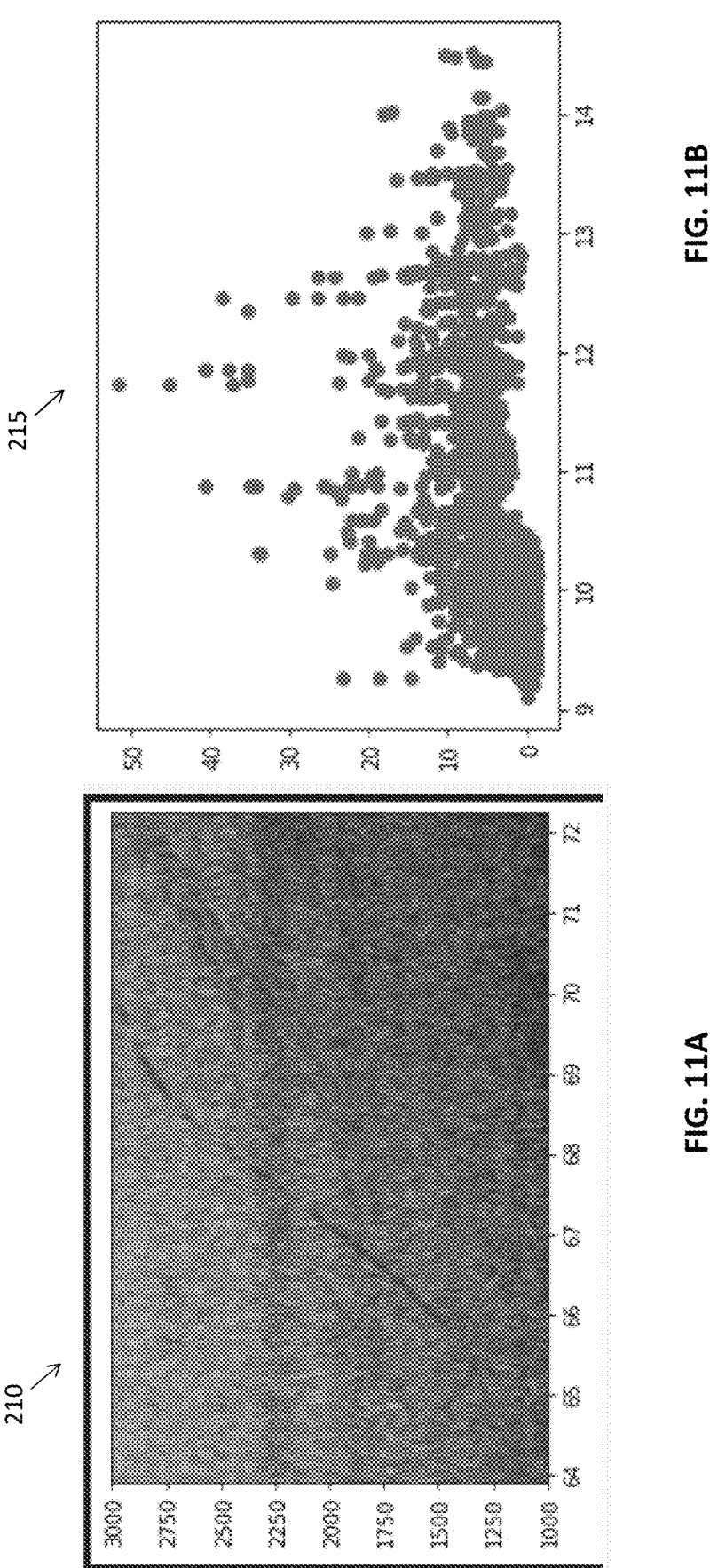

FIG. 7A shows a third spectrogram representing the frequency composition of an audio signal;

FIG. 7B shows a fourth spectrogram representing the frequency composition of the audio signal represented in FIG. 7A after application of a masked filter algorithm;

FIG. 8A shows a fifth spectrogram representing the frequency composition of an audio signal;

FIG. 8B shows a sixth spectrogram representing the frequency composition of the audio signal represented in FIG. 8A after application of a noise rejection filter algorithm;

FIG. 8C shows a seventh spectrogram representing the frequency composition of the audio signal represented in FIG. 8A after application of a masked filter algorithm;

FIG. 9A shows a second average sum order (ASO) corresponding to the fifth spectrogram shown in FIG. 8A;

FIG. 9B shows a third average sum order (ASO) corresponding to the sixth spectrogram shown in FIG. 8B;

FIG. 9C shows a fourth average sum order (ASO) corresponding to the seventh spectrogram shown in FIG. 8A;

FIG. 10A shows an eighth spectrogram representing the frequency composition of an audio signal for a balancer shaft and a turbocharger;

FIG. 10B shows a fifth average sum order (ASO) corresponding to the eighth spectrogram shown in FIG. 10A;

FIG. 11A shows a ninth spectrogram representing the frequency composition of the audio signal represented in FIG. 10A after application of a masked filter algorithm; and FIG. 11B shows a sixth average sum order (ASO) corresponding to the ninth spectrogram shown in FIG. 11A.

DETAILED DESCRIPTION

An audio processing system 1 in accordance with an embodiment of the present invention is described herein with reference to the accompanying figures. The audio processing system 1 in the present embodiment is suitable for processing an at least one audio signal AS-n captured by a microphone 5 provided on a vehicle 3. The audio processing system 1 is described herein with reference to the analysis of a first said audio signal AS-1.

The vehicle 3 in the present embodiment is a road vehicle, such an automobile, a sports utility vehicle or a utility vehicle. The vehicle 3 comprises a plurality of vehicle systems VS-n. In use, one or more of the vehicle systems VS-n functions as an audio source that emits sound in the form of acoustic waves. The vehicle system(s) VS-n that emit sound waves are referred to herein as sound-emitting vehicle systems VS-n. The sound waves may have frequencies in the audible frequency range (less than approximately 20,000 hertz) and optionally also the ultrasonic frequency range (greater than approximately 20,000 hertz). In use, the microphone 5 captures at least some of the sound waves generated by the sound-emitting vehicle systems VS-n and generates the first audio signal AS-1. The resulting first audio signal AS-1 comprises audio data representing the sound waves emitted by the one or more said sound-emitting vehicle systems VS-n operating on the vehicle 3 at any given time. The microphone 5 in the present embodiment captures the audible sound emitted by the sound-emitting vehicle systems VS-n. In a variant, the microphone 5 could be configured also to capture ultrasonic sound waves for analysis. The audio from the microphone 5 is recorded at its sampling rate. As described herein, the audio processing system 1 is configured to analyse the first audio signal AS-1 to monitor operation of the sound-emitting vehicle systems VS-n.

The audio processing system 1 is configured to receive an operating signal OS-n indicating an operating state of the or each sound-emitting vehicle system VS-n. The audio processing system 1 analyses the first audio signal AS-1 in dependence on the indicated operating state of the associated sound-emitting vehicle system VS-n.

It will be understood that the audio processing system 1 is operable in conjunction with a range of different second sound-emitting vehicle systems VS-n. By way example, the audio processing system 1 according to the present embodiment is described herein with reference to the following:

a first said sound-emitting vehicle system VS-1 is in the form of an internal combustion engine;

a second said sound-emitting vehicle system VS-2 is in the form of a balancer shaft; and a third said sound-emitting vehicle system VS-3 is in the form of a turbocharger.

The internal combustion engine VS-1 is provided to generate a propulsive force to propel the vehicle 3. Alternatively, or in addition, the internal combustion engine may be provided to charge an onboard traction battery, for example to power a traction battery to propel the vehicle. The balancer shaft VS-2 is an eccentric shaft provided to balance operational loads in the internal combustion engine VS-1. The turbocharger VS-3 is provided to introduce air into the internal combustion engine VS-1 at a pressure greater than atmospheric pressure. Sound waves associated with the operation of each of the first, second and third sound-emitting vehicle systems VS-1, VS-2, VS-3 are detectable in a cabin 11 of the vehicle 3. Other examples of the sound-emitting vehicle system VS-n include an electric traction motor (not shown). For example, the vehicle 3 may be a plug-in hybrid electric vehicle (PHEV) or a battery electric vehicle (BEV) comprising one or more electric traction motor. Other examples of the sound-emitting vehicle system VS-n include a friction brake which, in use, may generate a brake squeal when subject to a fault condition. The processing of the first audio signal AS-n may be performed in dependence on a reference velocity (VREF) of the vehicle 3, for example to account for road noise and/or wind noise detectable in the cabin.

In the present embodiment, the microphone 5 is disposed in the cabin 11. The microphone 5 may be a dedicated device for use exclusively with the audio processing system 1. Alternatively, the microphone 5 may be used by one or more other systems, such as an infotainment system. The audio processing system 1 may communicate with a telematic unit on the vehicle 3 to access the audio signal AS-n. By way of example, the microphone 5 may also capture voice commands or audio inputs for a communication system provided on the vehicle 3. It will be understood that the microphone 5 could be provided in other locations of the vehicle 3, for example in an engine bay or an electric traction motor compartment. The audio processing system 1 may receive a plurality of audio signals AS-n, for example from a plurality of the microphones 5 disposed in different locations in the vehicle 3.

The audio processing system 1 could be implemented directly on the vehicle 3. For example, one or more controller may be provided on the vehicle 3 to process the audio signal AS-n. Alternatively, the processing of the audio signal AS-n may be performed offboard on a remote server. The data may be output from the vehicle 3 to the remote server for processing. This arrangement may reduce the computational requirements onboard the vehicle 3. The data may be transmitted wirelessly, for example over a wireless communication network; or may be downloaded over a wired connection. The data may be transmitted in real-time.

Figure 1:
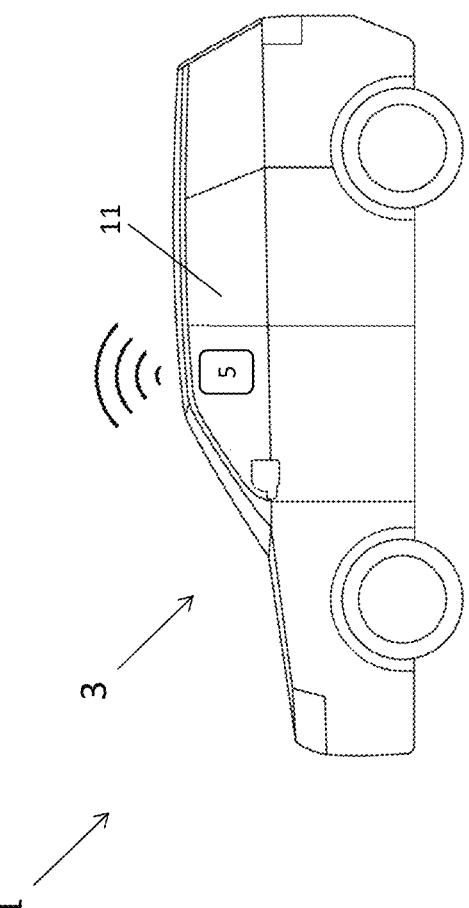
FIG. 1 shows a schematic representation of a vehicle configured to capture an audio signal for analysis by an audio processing system in accordance with an embodiment of the present invention.
Figure 2:
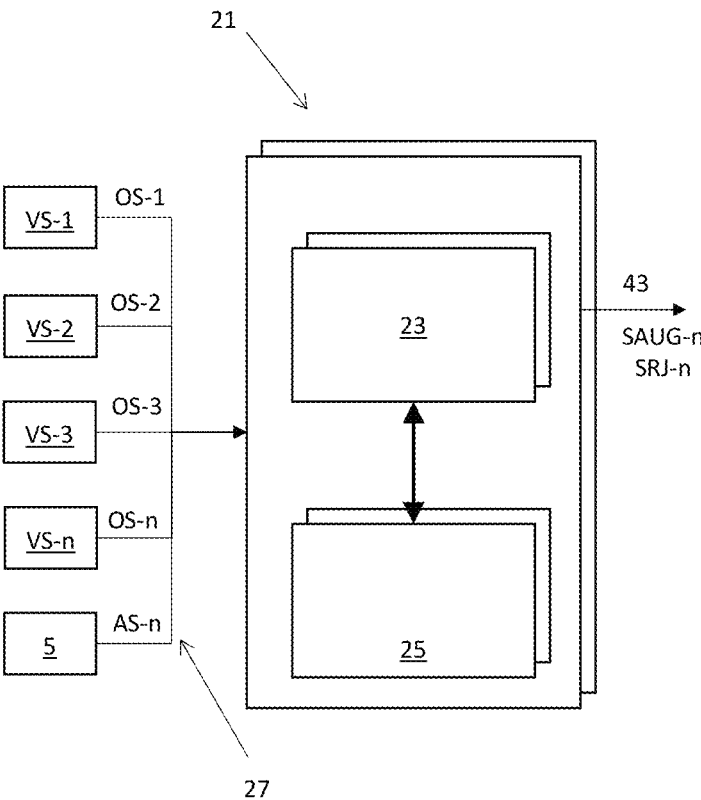
FIG. 2 shows a schematic representation of an onboard controller in the audio processing system shown in FIG. 1.

As shown in FIG. 2, the vehicle 3 comprises an onboard controller 21 comprising at least one first electronic processor 23 and a first system memory 25. The at least one electronic processor 23 has at least one electrical input for receiving vehicle operating signals OS-n and the audio signal AS-n. The onboard controller 21 is configured to read the vehicle operating signals OS-n from a vehicle communication bus 27, such as Controller Area Network (CAN) bus. The operating signals OS-n comprise operating data indicating a current (i.e., instantaneous) operating state of the vehicle systems VS-n. In the present embodiment, a first said operating signal OS-1 indicates an operating speed of the internal combustion engine VS-1. A second said operating signal OS-2 indicates a rotational speed of the balance shaft VS-2. A third said operating signal OS-3 indicates a rotational speed of the turbocharger VS-3. One or more additional operating signal OS-n may be captured.

The at least one first electronic processor 23 is configured to process the first audio signal AS-1 in dependence on the indicated operating state of the associated sound-emitting vehicle system VS-n. The processing of the first audio signal AS-1 may be performed at least substantially in real time. The first audio signal AS-1 generated by the microphone 5 is in a time domain. The at least one electronic processor 23 is configured to transform the audio signal AS-1 to a frequency domain. The subsequent analysis of the audio signal AS-1 is performed with respect to frequency (rather than time). The frequency domain provides a quantitative indication of the components of the audio signal AS-1 at each frequency. The at least one electronic processor 23 applies a transform, such as a Fourier transform, to decompose the audio signal AS-1 into a plurality of frequency components. By way of example, the at least one first electronic processor 23 implements a fast Fourier transform algorithm to determine a discrete Fourier transform of the audio signal AS-1. Other transforms may be used to transform the audio signal AS-1. A transform creates a frequency domain representation of the audio signal AS-1. A spectrogram provides a visual representation of the spectrum of frequencies of the audio signal AS-1 as it varies with respect to time. The frequency domain representation comprises information about the frequency content of the audio signal AS-1. The magnitude of the frequency components provides an indication of a relative strength of the frequency components. The processing of the audio signal AS-1 enables decoupling (i.e., separation or isolation) of the audio profiles associated with the sound-emitting vehicle systems VS-n. This enables analysis of each audio profile present in the audio signal AS-1.

Figure 3:
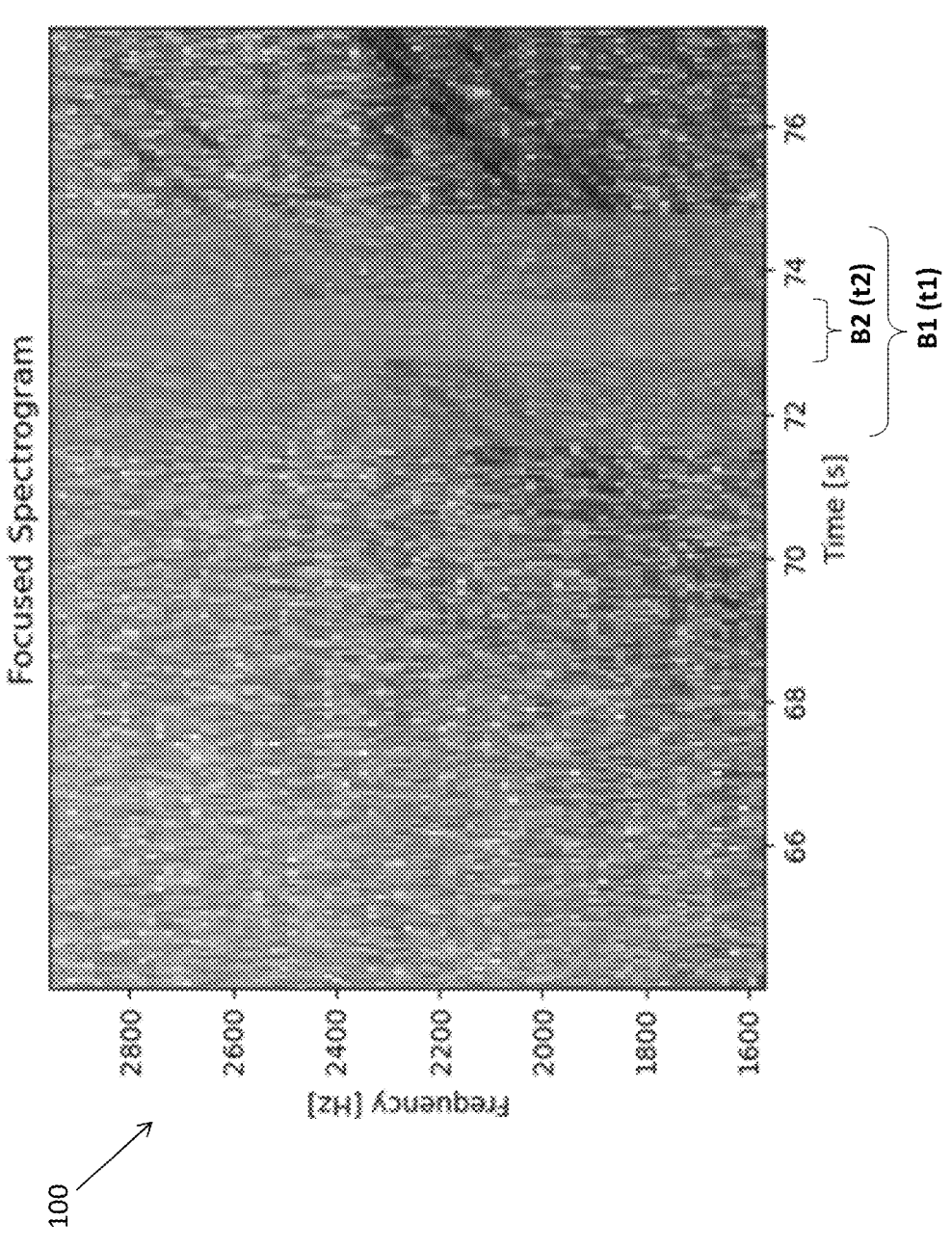
FIG. 3 shows a first spectrogram representing the frequency composition of a first audio signal.

A first spectrogram 100 representing the spectrum of frequencies of the audio signal AS-1 with respect to time is shown in FIG. 3. A first (wide) band B1 is identified corresponding to a first time period t1 within the first spectrogram 100; and a second (narrow) band B2 is defined corresponding to a second time period t2 within the first spectrogram 100. The second band B2 is narrower than the first band B1. As illustrated in the first spectrogram 100, the second band B2 is contained entirely within the first band B1. The first band B1 is used to determine an audio profile (or signature) within the frequency domain representation. The determined audio profile is used to generate a filter for filtering the audio signal AS-1. The filter in the present embodiment is applied within the second band B2 of the first spectrogram 100. The generation of the filter in dependence on the audio profile for the internal combustion engine VS-1 will now be described.

Figure 4:
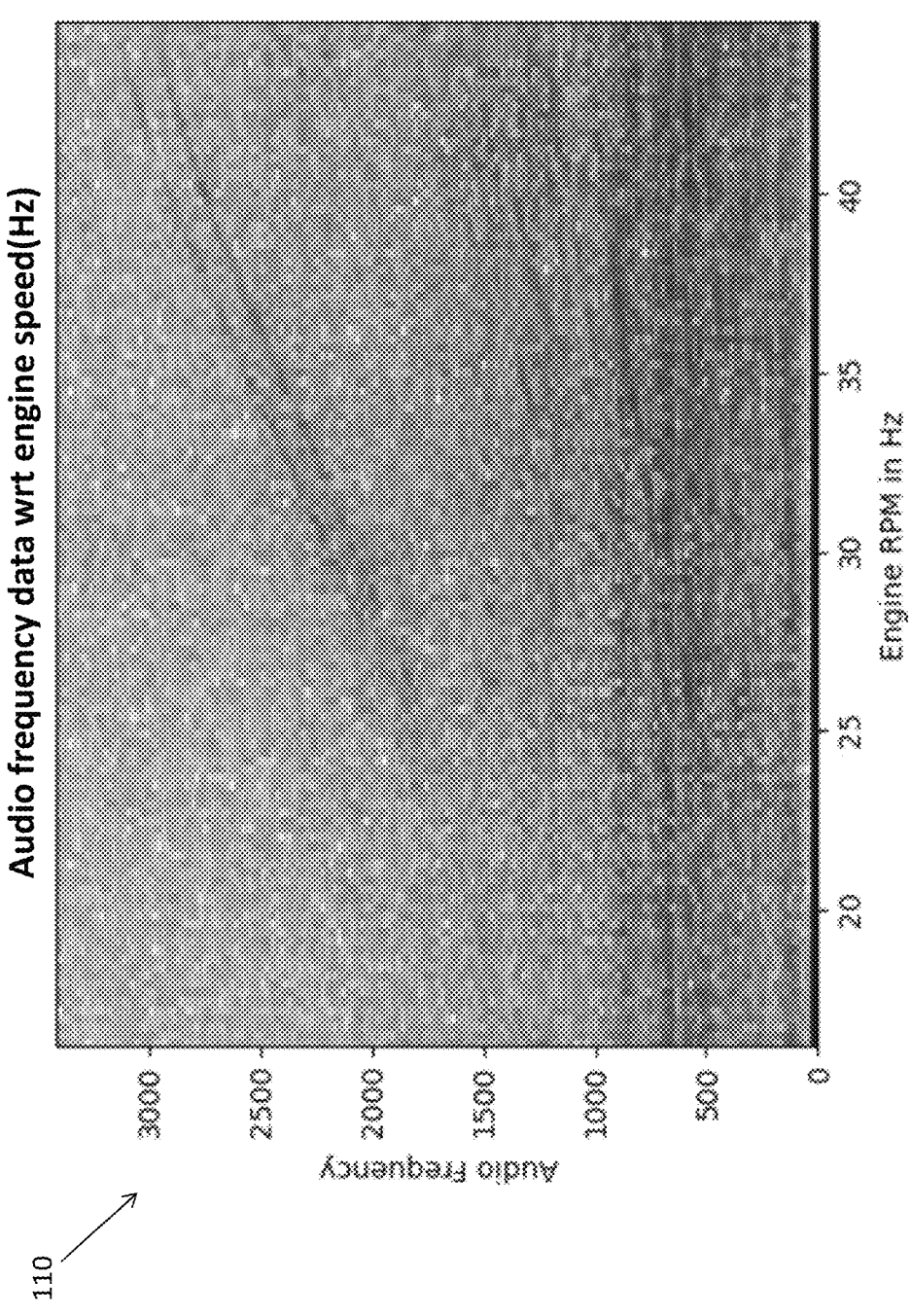
FIG. 4 shows a second spectrogram representing the frequency composition in relation to engine speed (rpm)
Figure 5:
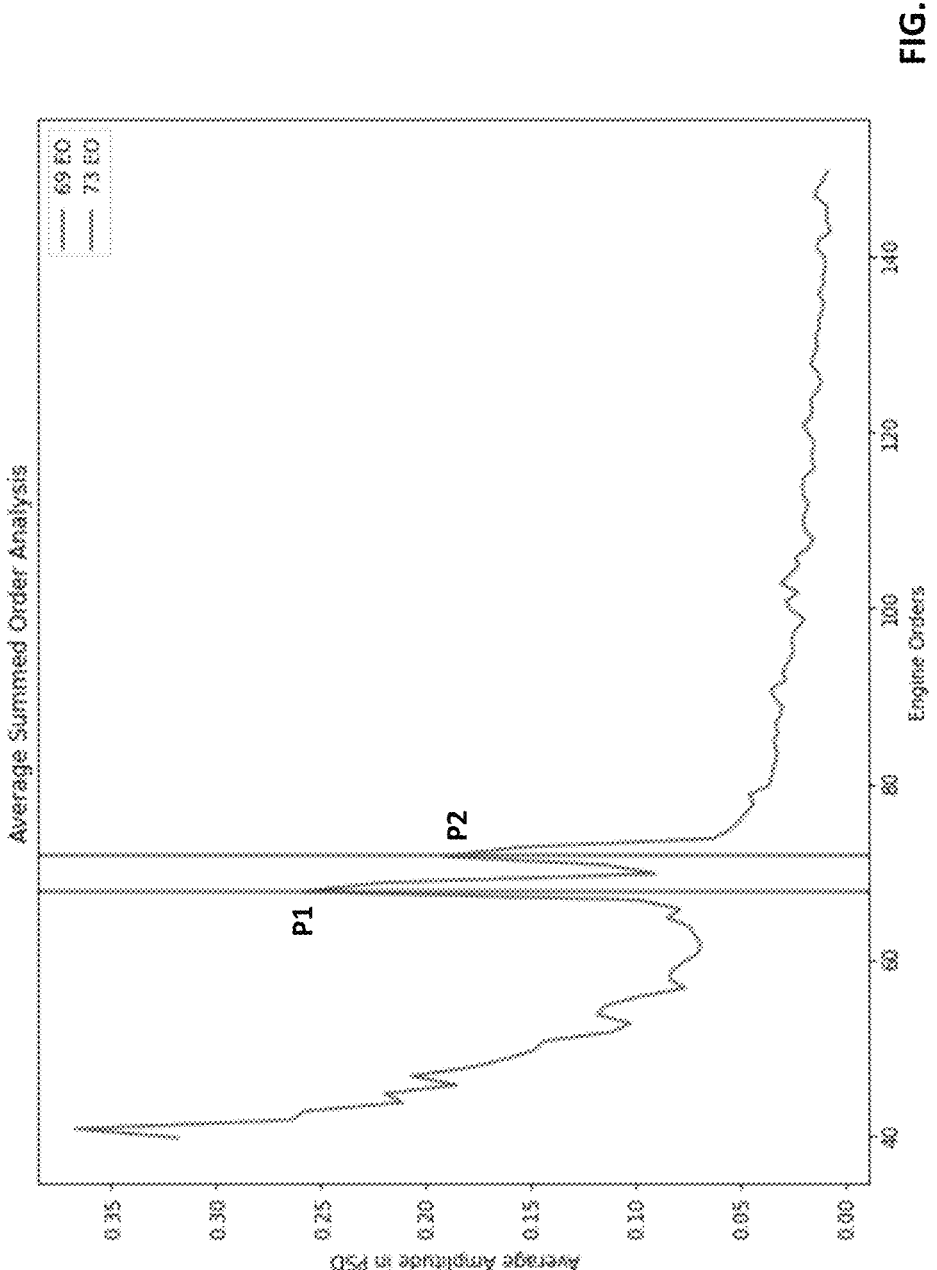
FIG. 5 shows a first average sum order (ASO) plot corresponding to the first spectrogram shown in FIG. 3.
Figure 5:

A second spectrogram 110 representing the spectrum of frequencies of the audio signal AS-1 with respect to an operating speed (rpm) of the internal combustion engine VS-1 is shown in FIG. 4. The first audio signal AS-1 is processed in dependence on the operating state of one of the sound-emitting vehicle system VS-n. An engine order is determined representing the number of times that an audio profile is identified per engine rotation. For example, engine order forty (40) denotes an event which happens forty (40) times per engine rotation. The engine order for each entry in the spectrogram is calculated by dividing the frequency of audio by the engine rotation speed (Hz). An average sum order (ASO) is calculated representing the energy levels for each engine order. The ASO may, for example, be calculated in the first band B1 of the frequency domain representation of the audio signal AS-1. An analysis is performed to identify active orders occurring in the ASO analysis. The or each active order comprises a peak in the determined ASO representing a higher energy level. In the present example, the or each active order is an active engine order representing an audio component (or audio signature) which is in-phase with the operation of the internal combustion engine VS-1. Conversely, the or each trough in the ASO analysis may represent an audio component which is out-of-phase with the operation of the internal combustion engine VS-1. A peak identification algorithm is applied to identify the or each peak in the determined ASO, thereby enabling determination of the active engine orders. A first ASO plot 120 representing the amplitude of the ASO for the engine orders is shown in FIG. 5. In the illustrated example, the peak identification algorithm identifies first and second peaks P1, P2 corresponding to respective first and second active engine orders. In the present example, the first and second active engine orders occur at engine orders sixty-nine (69) and seventy-three (73) respectively. The identified active engine orders define the audio profile associated with the balancer shaft VS-2. In order to decouple the audio profile corresponding to the internal combustion engine VS-1, the ASO algorithm may be tuned to detect the largest number of active engine orders occurring within a given range. It will be understood that the same analysis may be performed to determine the audio profile of each of the sound-emitting vehicle systems VS-n. The audio profile of each sound-emitting vehicle system VS-n is represented by the identified active orders within the frequency domain representation of the audio signal AS-1. A filter is generated in dependence on the determined audio profile. The amplitude is plotted against frequency in a first plot 130 shown in FIG. 6 in respect of a particular time period modified to reflect application of a masking filter.

A noise rejection algorithm may be applied at least partially to reject the audio components associated with one or more of the sound-emitting vehicle systems VS-n. At least in certain embodiments, the noise rejection algorithm may reduce the amplitude of the background noise to facilitate analysis of selected portions of the audio signal. The noise rejection filter may implement a noise rejection algorithm which at least partially rejects noise other than the identified audio profile. The noise rejection algorithm may, for example, be applied at least partially to reject noise (sound) in the audio signal AS-1 which does not relate to a particular one of the sound-emitting vehicle systems VS-n. In the above example, the noise rejection algorithm retains the active engine orders corresponding to the sound waves emitted by the operation of the internal combustion engine VS-1. The analysis of the internal combustion engine VS-1 may be facilitated by rejecting noise associated with one or more of the other sound-emitting vehicle systems VS-n, such as the balancer shaft VS-2 and the turbocharger VS-3. The audio component associated with the balancer shaft VS-2 will be in-phase with engine speed (rpm) and will be retained in case of noise rejection algorithm. Since the audio component associated with the balancer shaft VS-2 occur in specific engine orders, it is possible to filter them out separately from other engine noises. However, this may require another filter, for example to filter out the 69th and 73rd engine orders separately. The turbocharger VS-3 and other noises, such as brake squeal, road noises and air conditioning (AC) vent noise will be out-of-phase with the engine speed (rpm). This enables background noise at least partially to be filtered from the first audio signal AS-1. At least in certain embodiments the application of the noise rejection algorithm helps to isolate the audio profile associated with the internal combustion engine VS-1. Fault diagnostics may more readily be performed in respect of the decoupled audio signal.

The noise rejection algorithm comprises the following processes:

Identify the nearest troughs on both sides of the relevant peaks

Any consecutive peaks (peaks which share troughs) will be considered one combined peak with the trough before the first peak and the trough after the last peak as relevant troughs.

Multiply the time bin with the attenuating factor.

For each peak or combined peak:

Retain the peak value but multiply the first rising edge and the last falling edge with a linearly interpolated weight vector to ensure a smooth transition between the signal and the noise.

Output: Filtered signal for selected time period with background noise attenuated.

Alternatively, a signal mask may be applied at least partially to reduce the audio components associated with one or more of the sound-emitting vehicle systems VS-n. The filter may be in the form of a masking filter. The masking filter may be implemented by a masking algorithm which removes or reduces noise corresponding to the identified audio profile. The masking algorithm reduces the amplitude of the peaks identified in the ASO corresponding to the audio profile of one or more of the sound-emitting vehicle systems VS-n. The masking algorithm may, for example, reduce the magnitude of the peaks by keeping a baseline as the line connecting two troughs on each side of the peak. By way of example, the audio profile corresponding to the internal combustion engine VS-1 may be masked. This may, for example, facilitate fault diagnostics in at least one of the other sound-emitting vehicle systems VS-n, such as the turbocharger VS-3. In the illustrated example, the noise masking algorithm reduces the active engine orders corresponding to the sound waves emitted by the operation of the internal combustion engine VS-1.

The masking algorithm comprises the following processes:

Identify the nearest troughs on both sides of the relevant peaks.

Any consecutive peaks (peaks which share troughs) will be considered one combined peak with the trough before the first peak and the trough after the last peak as relevant troughs.

For each peak or combined peak:

Join the troughs on both sides of the peak to get a baseline.

The difference between the original value and the baseline value is multiplied by the attenuating factor and added to the baseline value to get the final value.

(Final value=Baseline value+Attenuating factor* (Original value−Baseline value))

Output: Filtered signal for selected time period with peaks corresponding to the base signal attenuated.

Figure 6:
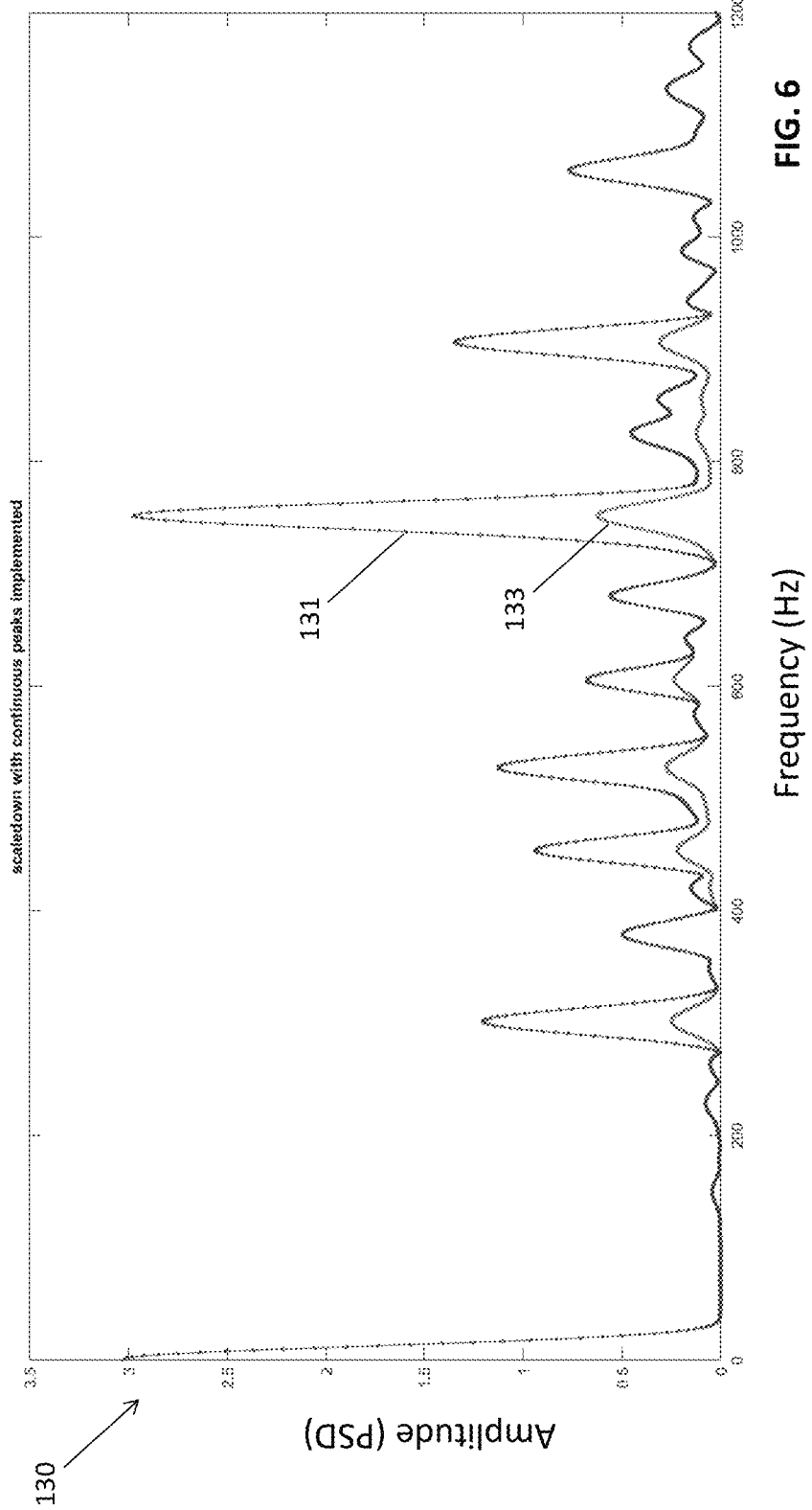
FIG. 6 shows a amplitude vs frequency plot for a particular time period modified to reflect application of a masking filter.

The first plot 130 shown in FIG. 6 comprises a first trace line 131 representing an ASO analysis of the frequency domain representation of the first audio signal AS-1. A second trace line 133 represents the filter signal generated by application of the signal masking filter. An example of the application of the masking filter to mask engine orders is shown in FIGS. 7A and 7B. A third spectrogram 140 is shown in FIG. 7A representing the source audio data. A fourth spectrogram 150 shown in FIG. 7B represents a filtered version of the third spectrogram 140 after application of the masked filter. The magnitude of the peaks corresponding to the base signal are reduced in the fourth spectrogram 150 compared to the source data represented in the third spectrogram 140.

The application of the noise rejection filter and the noise masking filter will now be illustrated with reference to an example. In this example, a fault condition is present in the balancer shaft VS-2 resulting in balancer shaft whine. The effects of applying the noise rejection filter and the noise masking filter to the first audio signal AS-1 will now be described. A fifth spectrogram 160 representing the frequency composition of a source (raw) audio signal AS-1 with respect to time is shown in FIG. 8A. A second ASO plot 165 corresponding to the fifth spectrogram 160 is shown in FIG. 9A. The second ASO plot 165 comprises a first trace 167 representing the ASO with respect to the engine order.

The first audio signal AS-1 is filtered using a noise rejection filter determined in dependence of the audio profile for the balancer shaft VS-2. A sixth spectrogram 170 representing the resulting (noise rejection) filtered audio signal AS-1 is shown in FIG. 8B; and a corresponding third ASO plot 175 is shown in FIG. 9B. The third ASO plot 175 comprises a second trace 177 representing the ASO with respect to the engine order. The audio components associated with the sounds emitted by the balancer shaft VS-2 are more readily identifiable after application of the noise rejection filter.

The first audio signal AS-1 is filtered using a noise masking filter determined in dependence of the audio profile for the balancer shaft VS-2. An seventh spectrogram 180 representing the resulting (noise masked) filtered audio signal AS-1 is shown in FIG. 8C; and a corresponding fourth ASO plot 185 is shown in FIG. 9C. The fourth ASO plot 185 comprises a first trace 187 representing the ASO with respect to the engine order. The noise components associated with the sounds emitted by the balancer shaft VS-2 are reduced, thereby rendering the audio components associated with the internal combustion engine VS-1 and the turbocharger VS-3 more readily identifiable. This may be appropriate, for example, to reduce obfuscation of signal components by the audio profile associated with the balancer shaft whine.

An eighth spectrogram 200 representing the frequency composition of the source (raw) audio profile AS-1 with respect to time is shown in FIG. 10A. A corresponding fifth ASO plot 185 is shown in FIG. 10B. In this example, fault conditions are present in both the balancer shaft VS-2 and the turbocharger VS-3 resulting in a balancer shaft whine and a turbocharger whine. A particular problem in this scenario is that the audio components associated with the balancer shaft whine and turbocharger whine interfere with each other as the sounds are in the same frequency range. An active turbocharger order is expected to be identified in the twelfth ($12^{th}$) turbocharger order. However, as illustrated in the fifth ASO plot 205 shown FIG. 10B, the ASO analysis of the frequency domain representation of the first audio profile AS-1 is inconclusive due to the interference from the balancer shaft whine (represented by a cluster formation obfuscating the active turbocharger orders).

The audio processing system 1 in the present embodiment is operable to decouple the audio components associated with the balancer shaft VS-2 and the turbocharger VS-3. The engine speed (RPM) is used as a base signal to decouple the balancer shaft VS-2. The signal masking filter is applied to mask the audio profile associated with the balancer shaft VS-2, thereby reducing the noise emitted by the balancer shaft VS-2 in the first audio signal AS-1. The audio profile associated with the balancer shaft VS-2 is tightly coupled (i.e., closely correlated) with the speed (rpm) of the internal combustion engine VS-1. The audio profile associated with the turbocharger VS-3 is not synchronized with the speed (rpm) of the internal combustion engine VS-1. This distinction facilitates decoupling of the audio profiles associated with the balancer shaft VS-2 and the turbocharger VS-3. The signal masking filter is effective in reducing the audio component associated with the turbocharger VS-3.

A ninth spectrogram 210 representing the frequency composition of the (noise masked) filtered audio profile AS-1 is shown in FIG. 11A. The corresponding ASO for the filtered audio profile AS-1 is represented in a sixth ASO plot 215 shown in FIG. 11B. The first audio signal AS-1 is filtered in dependence on the determined audio profile of the balancer shaft VS-2. The masking algorithm is applied to reduce the audio components associated with the sounds emitted by the balancer shaft VS-2. The application of the masking algorithm may facilitate identification of the fault condition in the turbocharger VS-3. The filtered sixth spectrogram 160 represents the frequency composition after application of the noise masking filter. The corresponding ASO for the (noise masking) filtered audio profile AS-1 is represented in the sixth ASO plot 215. The noise components associated with the sounds emitted by the balancer shaft VS-2 are reduced, thereby rendering the audio components associated with the turbocharger VS-3 more readily identifiable.

The first audio signal AS-1 is preferably captured when certain user-controlled vehicle systems VS-n, such as a heating ventilation and air conditioning (HVAC) unit and an infotainment system, are deactivated. However, the processing of the first audio signal AS-1 could be performed taking account of the user-controlled vehicle systems VS-n. For example, the first audio signal AS-1 could be processed to filter sounds associated with the operation of a fan for introducing air into the cabin. The processing of the audio signal AS-1 could be performed in dependence on an operating speed of the fan. Furthermore, the first audio signal AS-1 is preferably captured when windows to the cabin of the vehicle are closed. This may help to reduce ambient noise in the cabin of the vehicle 3.

The audio profile associated with one or more fault conditions in each of the sound-emitting vehicle systems VS-n may be determined through analysis of empirical data. An audio signal AS-n may be captured by the microphone 3 when one or more known fault condition is present. The captured audio signals AS-n may be analysed to determine one or more audio fault indicators of the presence of the or each fault condition in the vehicle system(s) VS-n. The audio processing system 1 described herein may analyse the first audio signal AS-1 to identify the audio fault indicators. The method(s) described herein to decouple the audio components contained within the audio signal AS-n facilitate identification of the audio fault indicators.

It has been recognised that the techniques described herein to decouple the audio signal AS-n may facilitate generation of a sound augmentation signal SAUG-n for dynamically augmenting the sound generated by the one or more vehicle systems VS-n, for example the internal combustion engine VS-1. Augmenting the engine sound need not retain the engine order frequency and amplify it. Augmenting the engine sound can comprise one or more of the following: changing the engine orders; add/remove audio components in different engine orders which can be used to copy the sound profile of another vehicle and to significantly alter how the engine sounds to a vehicle driver or occupant. The onboard controller 21 may be configured to generate the sound augmentation signal SAUG-n in dependence on the identified first audio profile. The sound augmentation signal SAUG-n is supplied to one or more sound generating devices, such as a loudspeaker, in a cabin of the vehicle 3. The first sound augmentation signal SAUG-n causes the sound generating device to generate sound waves to enhance or the sound waves originating from the internal combustion engine VS-1. The sound augmentation signal SAUG-n may be configured to control the sound generating device to generate sound at a frequency present in the audio profile of one or more of the vehicle systems VS-n. The sound may be generated at a frequency which is the same as or different from the or each active order present in the audio profile. For example, the sound augmentation signal SAUG-n may be configured to cause the sound generating device to generate sound having a frequency at least substantially equal to the active engine orders associated with the internal combustion engine VS-1 to augment the engine sound in the cabin of the vehicle 7. The onboard controller 21 may be configured to generate the sound augmentation signal SAUG-n in dependence on the identified first audio profile.

Alternatively, or in addition, a sound rejection signal SRJ-n may be generated to cause destructive interference at least partially to reduce a component of the sound generated by one or more of the sound generating devices VS-n. The sound rejection signal SRJ-n may be generated in dependence on the identified first audio profile. The sound rejection signal SRJ-n may control the one or more sound generating devices in the cabin of the vehicle 3 to reduce the amplitude of the one or more audio components. The sound rejection signal SRJ-n may cause the sound generating device to generate sound waves to reduce or to cancel the sound waves originating from the first vehicle system VS-n.

It will be appreciated that various changes and modifications can be made to the present invention without departing from the scope of the present application.

We claim:

1. An audio processing system for a vehicle, the audio processing system being configured to process an audio signal representing sound waves originating from at least three vehicle systems disposed on the vehicle, the audio processing system comprising a controller configured to:
   receive the audio signal from a microphone;
   process the audio signal to generate a frequency domain representation of the audio signal;
   receive operating signals indicating operating states, respectively, of the at least three vehicle systems; and decompose the frequency domain representation of the audio signal in dependence on the operating signals to identify audio profiles associated with the operation of the at least three vehicle systems, respectively, wherein the controller is configured to decouple the audio profiles from the audio signal;

wherein decoupling the audio profiles comprises generating decoupled audio signals composed of the audio profiles;

wherein the controller is configured to identify a fault condition indicator in one or more of the decoupled audio signals.

2. The audio processing system as claimed in claim 1, wherein the controller comprises at least one electronic processor for processing the audio signals to generate the frequency domain representation, the at least one electronic processor comprising:

at least one electrical input for receiving the audio signal and the operating signals; and at least one electrical output for outputting component signals identifying the audio profiles.

3. The audio processing system as claimed in claim 1, wherein decoupling any one of the audio profiles comprises generating a decoupled audio signal which excludes the other audio profiles.

4. The audio processing system as claimed in claim 1, wherein the controller is configured to generate sound augmentation signals for controlling a sound generating device, the sound augmentation signals being generated in dependence on the identified audio profiles.

5. The audio processing system as claimed in claim 4, wherein the sound augmentation signals are configured to control the sound generating device to generate sound waves to enhance the sound waves originating from one or more of the at least three vehicle systems.

6. The audio processing system as claimed in claim 1, wherein the controller is configured to generate sound rejection signals for controlling a sound generating device, the sound rejection signals being generated in dependence on the identified audio profiles.

7. The audio processing system as claimed in claim 6, wherein the sound rejection signals are configured to control the sound generating device to generate sound waves to reduce or to cancel the sound waves originating from the at least three vehicle systems.

8. The audio processing system as claimed in claim 1, wherein the at least three vehicle systems comprise an internal combustion engine; and the operating signals indicate an operating speed of the internal combustion engine.

9. The audio processing system as claimed in claim 1, wherein the at least three vehicle systems comprises an electric motor; and the operating signals indicate an operating speed of the electric motor.

10. A vehicle comprising:

an audio processing system configured to process an audio signal representing sound waves originating from at least three vehicle disposed on the vehicle, the audio processing system comprising a controller configured to:

receive the audio signal from a microphone;

process the audio signal to generate a frequency domain representation of the audio signal;

receive operating signals indicating operating states, respectively, of the at least three vehicle systems; and decompose the frequency domain representation of the audio signal in dependence on the operating signals to identify audio profiles associated with the operation of the at least three vehicle systems, respectively, wherein the controller is configured to decouple the audio profiles from the audio signal;

wherein decoupling the audio profiles comprises generating decoupled audio signals composed of the audio profiles;

wherein the controller is configured to identify a fault condition indicator in one or more of the decoupled audio signals.

\* \* \* \* \*